Jan. 14, 1964 W. KASTEN 3,117,925
FUEL QUALITY TESTING DEVICE
Filed June 27, 1960 2 Sheets-Sheet 1
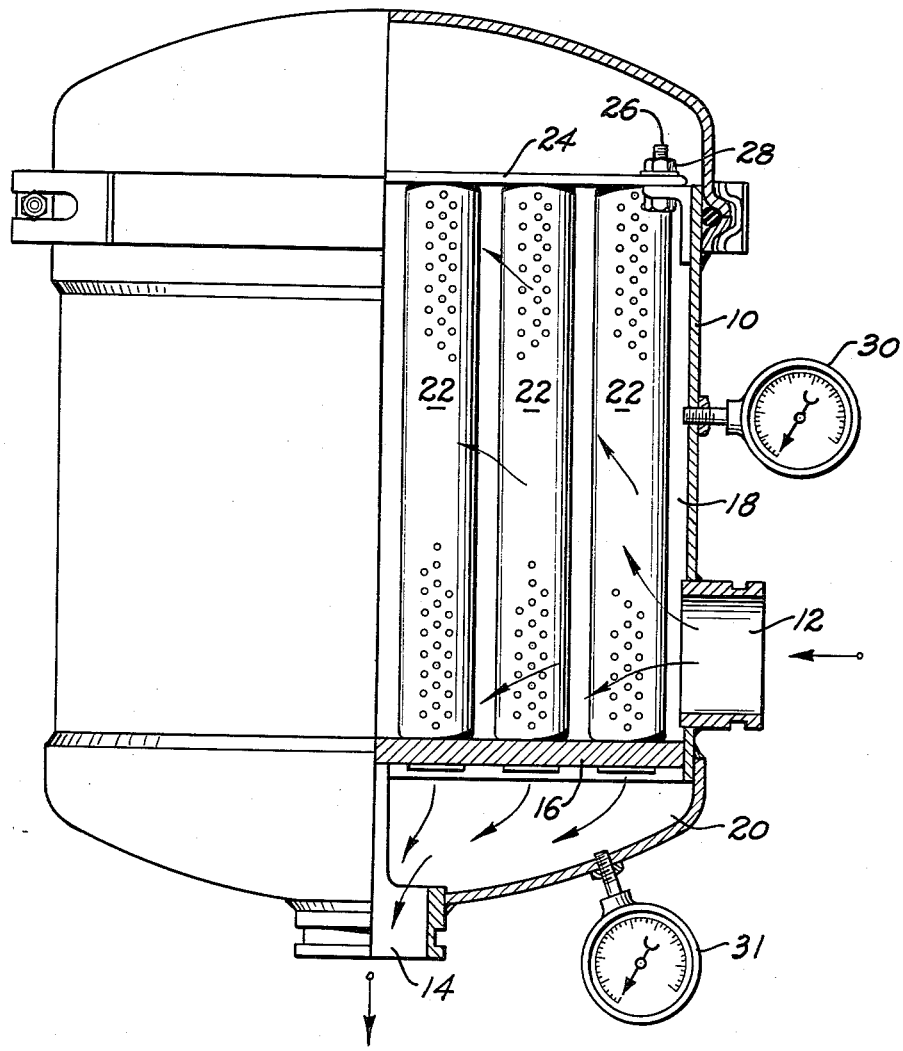
FIG_1
INVENTOR.
WALTER KASTEN.
BY
William N. Antonis
ATTORNEY.

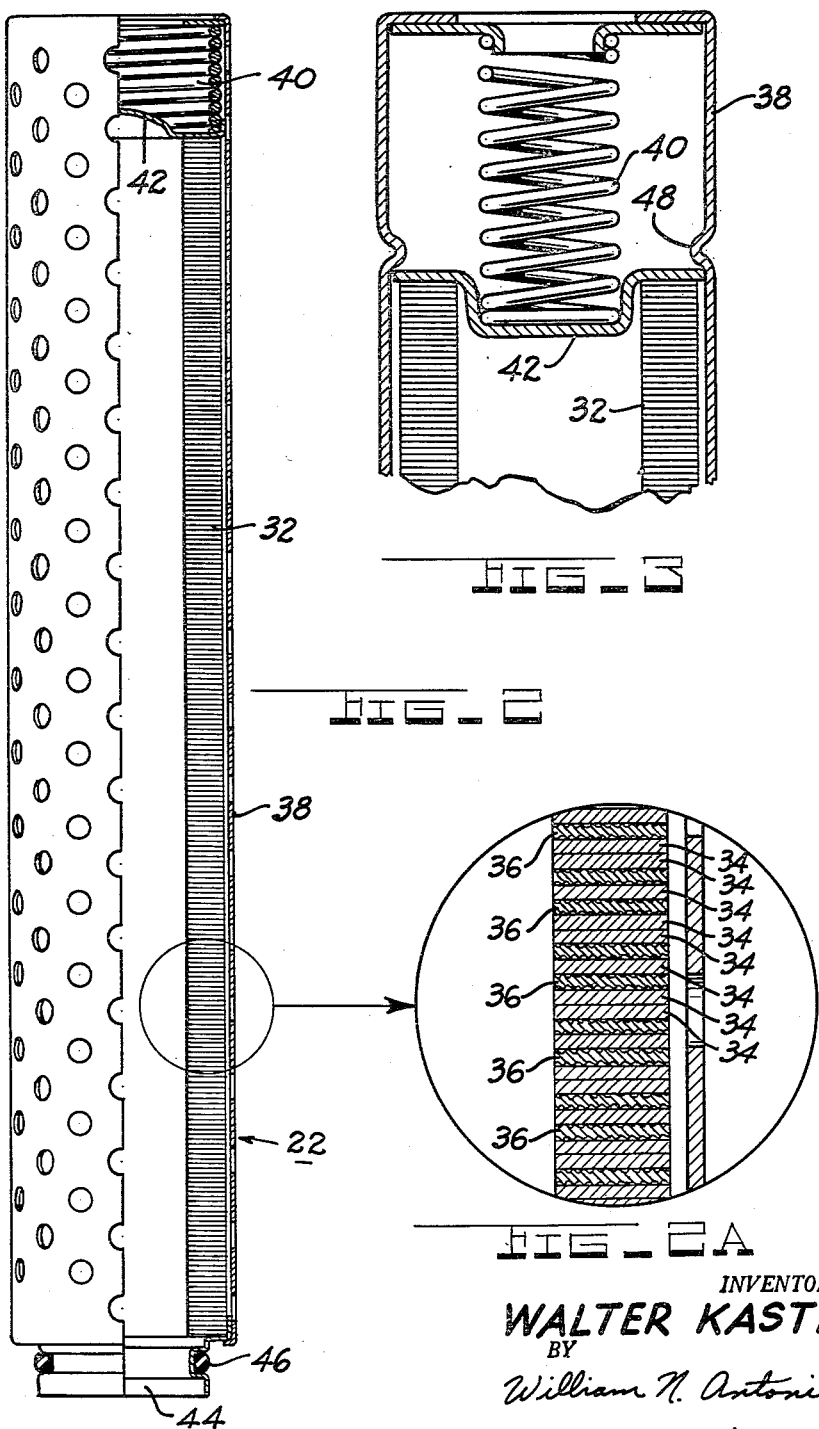

United States Patent Office 3,117,925
Patented Jan. 14, 1964

3,117,925
FUEL QUALITY TESTING DEVICE
Walter Kasten, Madison Heights, Mich., assignor to The Bendix Corporation, a corporation of Delaware
Filed June 27, 1960, Ser. No. 39,101
3 Claims. (Cl. 210—96)

This invention relates to a fuel quality testing device and more specifically to a fail-safe fuel quality testing device particularly useful in refueling aircraft.

While most fuel used in aircraft is acceptable high quality fuel, presently used refueling equipment is not foolproof. Even though efficient filtration and water seprating equipment is installed wherever fuel is transferred from one point to another, so that under normal operating conditions, fuel will be dispensed containing a low solid content and practically no undissolved water content, there is no guarantee that each aircraft refueled has acceptable fuel under all conditions and at each refueling.

All filter water separators are equipped with some type of coalescer and filter separator elements which retain the solid contamination contained in the fuel flowing therethrough. In so doing the elements gradually offer increased resistance to fuel flow until the pressure drop through the element becomes greater than the element strength. If the element is not replaced before this occurs, it will rupture and discharge into the aircraft fuel tanks a large amount of the contaminants it has collected. Subsequent flights, needless to say, with such contaminated fuel could prove disastrous, since the normal airborne filters are designed to remove only small traces of solid contaminants and no water. Large amounts of contaminants will quickly plug up these airborne filters, thus causing the bypass valves in the filters to open. The contaminated unfiltered fuel may then wear out the pumps and plug the servos of the fuel control. The water in the fuel might freeze in the fuel passages causing possible flameout, thereby endangering life and property.

Almost all of the currently used filter elements have a burst or rupture resistance between 10 p.s.i. and 75 p.s.i, with most of them being in the 10 p.s.i. to 25 p.s.i. range. To prevent rupturing, obviously, it is necessary to replace the elements before the critical pressure is reached. However, the average operator using current refueling equipment cannot be certain when to change the elements. If he replaces the elements too soon, that is, long before the burst pressure is reached, operating costs become exorbitant. If he waits too long, the elements will burst and discharge contaminated fuel into the aircraft.

Accordingly, it is an object of this invention to provide a true "GO–NO–GO" gage, which wil permit acceptable fuel to pass and stop unacceptable fuel. Acceptable fuel is normally considered to be fuel with a solids content not over 0.7 mg./liter and no undissolved water.

More specifically, it is an object of this invention to provide a contamination sensitive shut-off device which will stop the discharge of fuel containing unacceptable water concentration levels or unacceptable solid concentration levels, or any combination thereof, said device being capable of handling the full flow of all fuel discharged from a filter water separator and dispensed directly into an aircraft.

Another object of this invention is to provide a contamination sensitive device which will react immediately to contamination entering the device by registering an increase in pressure differential or completely stopping flow through the device. Such a device would be able to monitor filter water separator efficiency as well as provide an indication of filter water separator failure.

A further object of this invention is to provide an inexpensive contamination sensitive device which may be light and small in size for portable use in crowded locations or used as a permanently installed component of a refueling system for continuous operation.

Still further objects of this device are to provide a contamination sensitive device which will: (1) be foolproof and usable by base level unskilled personnel; (2) be able to withstand any system pressures encountered; (3) be able to withstand rough handling; (4) be functional regardless of what position it is placed in during use; (5) be operable without electrical connections, batteries or similar power sources; (6) be simple and inexpensive to service; and (7) not offer excessive pressure drop to flow when operated with fuel of acceptable contamination levels.

More specifically, it is an object of this invention to provide for use in a fuel quality testing device a plurality of fuse assemblies through which the fuel to be tested is passed, each of said fuse assemblies including a series of registered face to face contacting layers of material characterized in that it is inert at water contamination levels below a predetermined value, said layers being held together by a non-continuous bond to form a unitary tubular member having radial pores extending therethrough through which extremely fine solid contaminants may pass but not solid contaminants above a predetermined size, said fuse assemblies being constructed in such a manner that fuel having predetermined levels of solid and/or water contaminants will be prevented from passing through the pores of said unitary tubular member.

Other objects and advantages will become apparent from the following description and accompanying drawings, wherein:

FIGURE 1 is a sectional view of a fuel quality testing device incorporating my invention;

FIGURE 2 is an enlarged sectional view of one of the fuse assemblies fabricated in accordance with my invention;

FIGURE 2A is an enlarged, somewhat exaggerated, view of the circumscribed portion of the fuse shown in FIGURE 2; and FIGURE 3 is an enlarged sectional view of a portion of a fuse assembly showing a modification therein.

Referring to FIGURE 1 of the drawings, it will be seen that numeral 10 indicates a housing having a fuel inlet port 12 and a fuel outlet port 14. Suitably attached to the housing is a partition 16 which separates the interior of the housing into an inlet chamber 18 and an outlet chamber 20. A plurality of fuse assemblies 22 (only three of which are shown) are suitably attached to partition 16 and are retained in position by a retainer plate 24 which is operatively connected to housing 10 by three bolts 26 and nuts 28 (only one of which is shown). Pressure gages 30 and 31 are suitably connected to the chambers for measuring the pressure differential therebetween. The direction of flow through the unit is indicated by the arrows.

Each fuse assembly 22, as seen in FIGURES 2 and 2A, comprises a porous tubular member 32 which includes a first series of washer-like elements 34 having a relatively smooth surface and a second series of washer-like elements 36 having a relatively rough surface, such as that which is found on crepe paper. These elements may be formed from paper, cellulose, or other suitable fibrous or non-fibrous material. The tubular member is actually formed of smaller units each containing an odd number of washers wherein the outside washers are of the type 34 having a smooth surface. Consequently, the tubular member will have adjacent smooth washers at predetermined intervals. Such a construction permits the punching of washers from several layers of material with one punching operation. It has been found that, if an even number of alternately smooth and rough layers is used during the punching process, the exposed crepe or rough layer will stretch and cause continuous misalignment problems. However, by using odd numbered layered stacks wherein the outside layers are of the smooth type, such misalignment problems are avoided. The arrangement shown in FIGURE 2A results when using stacks of five layers.

These washers are assembled into a perforated tube 38, one end of which is closed, under a compression of a predetermined amount. In other words the washers are placed under a calibrated precompression. A spring 40, compressed to its solid or closed height, is located at the closed end of the tube and abuts a movable endplate 42, said endplate being in contact with one end of the porous tubular member 32. A ferrule 44, having an O-ring seal 46, is suitably attached to the other end of the tube 38. The spring 40 need not be compressed to its solid state, if means are provided to maintain the washers under a given compressive load over and above the compressive force created by the preload of the spring. Such a means could be a crimp 48 formed on the perforated tube, as shown in FIGURE 3.

After the fuel assembly is completed, the porous tubular member is treated with an epoxy resin solution which will impregnate the washers. An epoxy type resin solution having the following formulation has been found to be suitable for achieving the desired amount of impregnation:

| | Percent |
|---|---|
| Xylol (xylene) | 79 |
| Methyl Cellosolve | 6 |
| Epi-Rez 510 | 10 |
| Epi-Cure 855 | 5 |

In the above formulation methyl Cellosolve is a trade name for ethylene glycol monomethyl ether. Epi-Rez 510 is a liquid condensation product of bisphenol A and epichlorhydrin to yield diglycidyl ether of bisphenol A having a viscosity of 10,000–16,000 cp. Epi-Cure 855 is a curing agent which is a modified aliphatic polyamine having a viscosity of 150–400 cp.

The above referred to impregnation may be accomplished by dipping the whole assembly into the solution or by flowing the solution through the assembly. The excess solvent is then removed by blowing compressed air from the inside to the outside of the assembly. Finally the assembly is placed in an oven and cured for 30 minutes at 350° F. This bonds the washers into a continuous unit and makes them inert to minute traces of free water in the fuel flowing therethrough from the outside in, and also allows free passage of extremely fine contaminants existing in the fuel, thus giving the fuse a reasonable service life. Larger amounts of water in the fuel cause the washers to swell and thereby restrict the flow of fuel through the pores formed between the washers. Larger dirt particles likewise restrict flow through the pores, since they tend to build up on the outside surface of the porous tubular member 32. Predetermined amounts of water and/or solid contamination increases the pressure differential through the fuse to thereby create compressive forces at an ever increasing rate until a given magnitude of forces completely stops flow through the pores of the fuse.

To check the condition of the fuel being delivered to the aircraft or being discharged from a filter water separator, the inlet 12 of the unit is connected to the outlet of a filter water separator so that the full flow of the filter water separator output passes through the unit. The number and length of fuse assemblies 22 within the unit will determine the flow rating of the unit. During refueling of an aircraft with an effective filter water separator, pressure loss through the unit remains substantially constant. The fuses 32 are absolutely inert to clean fuel containing no undissolved water. When traces of slugs of water or solids in excess of predetermined cleanliness levels pass through the filter water separator into the unit, the fuses will sense the contamination immediately and register a practically instantaneous increase in pressure drop. This pressure drop, as previously stated, increases because the washers swell at water contamination levels above a predetermined value, thereby tending to decrease the pore sizes between the washers, and because of blocking of the pores by solid contaminants above a predetermined size. The unit is even more sensitive when subjected to fuel containing a combination of water and solid contaminants. Should the discharge of contaminants from the filter water separator persist for a period of a few minutes, the pressure will continue to rise until the maximum pumping system output pressure is reached, at which time the pores of the fuses will be closed so that flow therethrough will be completely cut off. The burst strength of these fuses will exceed 500 p.s.i., which is far higher than the average system pressure output. Thus, it can be seen that this fuel quality testing unit is truly a "GO-NO-GO" gage. It will permit acceptable fuel to pass, but not fuel contaminated with predetermined levels of solids and/or water.

To summarize, the fuses have two principal functions. First, they sense the presence of contamination by increasing the resistance to flow through the fuel quality testing unit. This increase in pressure can be noted by reading the pressure gage. Secondly, continuing flow of contaminated fluid into the unit will cause the fuses to completely stop flow therethrough.

Instead of using porous fuses formed from washers having radial pores therebetween, the fuses may also be formed by winding ribbon-like material edgewise to form a cylindrical member. The method for winding and making such an element is disclosed and claimed in my Patent No. 2,421,704, issued June 3, 1947.

It will be understood that the sensitivity of the fuses, that is the rate at which they will react to the presence of contamination in the fuel, may be controlled or varied by changing any one or combination of the following: (1) the surface finish of the fuse washers; (2) the preload applied to the fuse stack; (3) the treatment or hardness of the fuse washers; (4) the spring load applied; (5) the ratio between the outer diameter and the inner diameter of the fuse; (6) the length of the fuse stack; and (7) the rate of liquid forced through the fuse.

Those acquainted with this art will readily understand that the invention herein set forth is not necessarily limited and restricted to the precise and exact details presented and that various changes and modifications may be resorted to without departing from the spirit of my invention. Accordingly, applicant does not desire to be limited to the specific details described herein, primarily for purposes of illustration, but instead desires protection falling within the scope of the appended claims.

Having thus described the various features of the invention, what I claim as new and desire to secure by Letters Patent is:

1. A contamination sensitive device for use in connection with fuel transfer means comprising housing means having fuel inlet and outlet passage means, said fuel inlet passage means being operatively connected to said fuel transfer means for receiving the full flow of fuel therefrom, normally porous means interposed between said inlet and outlet passage means for normally permitting flow of all of said fuel therethrough, said means including at least one unitary fuse assembly comprising a cylindrical member having a plurality of inlet ports in the surface thereof and an outlet port at one end thereof, a series of washer-like elements in registered face to face contact located within said cylindrical member and characterized by being inert at water contamination levels below a predetermined value and swelling at water contamination levels above a predetermined value, said washer-like elements being arranged to form a tubular member having radial pores extending therethrough through which extremely fine solid contaminants may pass with said fuel flowing from outside said tubular member to inside said tubular member but not solid contaminants above a predetermined size, said tubular member being formed from a plurality of smaller units each of which comprises a first series of washer-like elements formed of a first material having opposed smooth faces and a second series of washer-like elements formed of a second material having opposed rough races, said first and second series of washer-like elements being interleaved and arranged to form units having outer layers of said first material, said tubular member having one end thereof abutting said one end of said cylindrical member and communicating with said outlet port, a movable nonporous end plate located within said cylindrical member and abutting the other end of said tubular member for closing off said end, and means located within said cylindrical member for maintaining predetermined compressive forces on said washer-like elements to limit the radial pore size therebetween, said radial pores being completely closed to thereby prevent flow of fuel therethrough when swelling of said material and blocking of said pores causes a differential pressure across said end plate sufficiently high to create additional compressive forces of a given magnitude on said washer-like elements.

2. A contamination sensitive shut-off device for use in connection with the outlet of a fuel filter and water separator unit comprising a housing having a fuel inlet passage and a fuel outlet passage, said fuel inlet passage being operatively connected to the outlet of said fuel filter and water separator unit for receiving the full flow of fuel therethrough, a partition operatively connected to said housing and located between said inlet and outlet passages, a plurality of normally porous unitary fuse assemblies operatively connected to said partition for permitting flow therethrough from said inlet passage to said outlet passage, each of said fuse assemblies including a perforated tube, a series of resin-impregnated washer-like elements in registered face to face contact located within said perforated tube and characterized by being inert to minute traces of water but swelling at water contamination levels above a predetermined value, said washer-like elements being held together by a noncontinuous bond to form a unitary tubular member having radial pores extending therethrough through which extremely fine solid contaminants may pass but not solid contaminants above a predetermined size, said tubular member being formed from a plurality of smaller units each of which comprises a first series of washer-like elements formed of a first material having opposed smooth faces and a second series of washer-like elements formed of a second material having opposed rough faces, said first and second series of washer-like elements being interleaved and arranged to form units having outer layers of said first material and alternate layers of said first and second materials therebetween, a ferrule operatively connected to one end of said tube and abutting one end of said tubular member, retaining means formed on the other end of said tube, a movable nonporous end plate located within said tube and abutting the other end of said tubular member, and spring means confined within said tube for maintaining a predetermined compressive force on said washer-like elements to limit the radial pore sizes therebetween, said radial pores being completely closed to thereby prevent flow of fuel therethrough when swelling of said material and blocking of said pores cause a differential pressure across said tubular member sufficiently high to create additional compressive forces of a given magnitude.

3. A contamination sensitive device for use in connection with fuel transfer means comprising housing means having fuel inlet and outlet passage means, said fuel inlet passage means being operatively connected to said fuel transfer means for receiving the full flow of fuel therefrom, normally porous means interposed between said inlet and outlet passage means for normally permitting flow of all of said fuel therethrough, said means including at least one unitary fuse assembly comprising a perforated tube, a plurality of washer-like elements in registered face to face contact located within said perforated tube and characterized by being inert at water contamination levels below a predetermined value and swelling at water contamination levels above a predetermined value, said washer-like elements being held together by a noncontinuous bond and arranged to form tubular means having radial pores extending therethrough through which extremely fine solid contaminants may pass but not solid contaminants above a predetermined size, said tubular member being formed from a plurality of smaller units each of which comprises a first series of washer-like elements formed of a first material having opposed smooth faces and a second series of washer-like elements formed of a second material having opposed rough faces, said first and second series of washer-like elements being interleaved and arranged to form units having outer layers of said first material and alternate layers of said first and second materials therebetween, a ferrule operatively connected to one end of said tube and abutting one end of said tubular means, retaining means formed on the other end of said tube, a movable nonporous end plate located within said tube and abutting the other end of said tubular means, and means confined within said tube for maintaining predetermined compressive forces on said washer-like elements to limit the radial pore size therebetween, said radial pores being completely closed to thereby prevent flow of fuel therethrough when swelling of said material and blocking of said pores cause a differential pressure across said tubular means sufficiently high to create additional compressive forces of a given magnitude.

References Cited in the file of this patent

UNITED STATES PATENTS

| | | |
|---|---|---|
| 2,079,365 | Thomas | May 4, 1937 |
| 2,495,095 | Ewbank | Jan. 17, 1950 |
| 2,692,686 | Fleck et al. | Oct. 26, 1954 |
| 2,842,152 | Winter et al. | July 8, 1958 |
| 2,845,080 | Kraft | July 29, 1958 |
| 2,872,044 | Kasten | Feb. 3, 1959 |
| 2,887,230 | Sicard | May 19, 1959 |
| 3,012,568 | Wooldridge et al. | Dec. 12, 1961 |
| 3,012,569 | Wooldridge et al. | Dec. 12, 1961 |
| 3,034,656 | Kasten | May 15, 1962 |

FOREIGN PATENTS

| | | |
|---|---|---|
| 703,752 | Great Britain | Feb. 10, 1954 |